Patented Mar. 4, 1941

2,233,574

UNITED STATES PATENT OFFICE 2,233,574

JELLYING PECTIN COMPOSITIONS

George L. Baker and Marvin W. Goodwin, Newark, Del., assignors to the Public of the United States No Drawing. Continuation of application Serial No. 258,191, February 24, 1939. This application August 9, 1939, Serial No. 289,124

3 Claims. (Cl. 99—132)

This invention relates to the preparation of powdered pectin compositions which will form jellies with or without added sugars, acids, flavoring or coloring materials. This is a continuation of our application, Serial No. 258,191, filed February 24, 1939.

Tarr and Baker, Bulletin 136 (1925), Delaware Agricultural Experiment Station, described a pectin-acid compound, a partially demethoxylated pectin with free acid radicles, which produced jellies with less than 50% soluble solids as sugar. Non-sugar jellies of pectin are also known, that is, gelation of aqueous pectin systems by the action of the enzyme pectase in the presence of metallic salts (Kopaczewski, Bull. Soc. Chim. Biol. 7, 419 (1925)), gelation of calcium-free pectin solutions upon adding $CaCl_2$ (Waele, Ann. Physiol. et Physicochim. Bio. 5, 864 (1939)) or the ammonium and potassium salts of pectic acid which produced jellies for Braconnot (Ann. chim. phys., 28, 173, (1825)). However, no powdered pectin composition has been known which will jelly without added sugar, glycerin, or similar dehydrating agent upon adding water or fruit juices followed by heating and cooling. Nor has a sugarless pectin jelly with low temperature melting points and the ability to reset to a jelly over a wide pH range been described.

An object of this invention is to prepare pectin compositions which can be used in lieu of animal gelatin or agars. A particular object is to prepare a pectin product which is suitable for food purposes, i. e., salads and desserts. Other and important objects will become apparent from the following description and appended claims.

This invention is based upon the discovery that partially demethoxylated pectins, prepared in the absence of metallic salts or organic compounds known to aid jellation, when heated with water in the presence of small amounts of these same metallic salts or organic compounds which aid jellation will form jellies upon cooling.

Pectins extracted at low temperatures, 60° C. or below, lose their methoxyl content without excessive depolymerization of the pectin molecule more easily than pectins extracted at higher temperatures. These low methoxyl pectins will have a proportionately higher concentration of free carboxyl groups, which means that they will combine more readily with metallic ions and be more easily precipitated. This forms the basis of certain methods of pectin recovery. The pectin to be found in our composition has been partially demethoxylated; the free carboxyl groups have not been allowed to react with metallic ions, but have been allowed to react with the weak base, ammonia. Upon adding sufficient ammonia to neutralize extraction acidities, viscosities are depressed in the pH range 3.5 to 7, allowing easy filtration and clarification. Dehydration or precipitation and drying of the pectin in this extract produces ammonium pectinate. When this pectinate is dry-mixed with certain other salts, such as those of calcium which are known to aid jellation or even to precipitate partially demethoxylated pectins, compositions are formed which will jelly upon adding water, heating and cooling. The heating in the presence of a salt which is known to aid jellying, causes the $NH_4$ ion to split off and a metallic pectinate to form and the mass jellies upon cooling. The amount of metallic salt added must be insufficient to satisfy the requirements of the free carboxyl groups, or immediate precipitation of the mass will take place. Other weak bases such as bicarbonate of soda which do not contain a substance known to aid jellation of pectin jellies can be used. Strong bases, NaOH and KOH, have been used to neutralize extraction acidities and the salts formed depress viscosities in a similar pH range to that used with ammonia but the jellies formed after using these bases were unsatisfactory in appearance and strength. The effect of various salts upon viscosity of pectin solutions is described by Baker and Goodwin, Bulletin 216 (1939), Delaware Agricultural Experiment Station.

Apple pomace and citrus albedo have been used in preparing this pectin composition. It is preferred practice to first remove solubles in either case by a hot leach treatment as described in Bulletin 204 (1936) Delaware Agricultural Experiment Station or in U. S. Patent No. 2,088,458 (1937). The moist, leached material is then treated with acid at a temperature below 60° C., the time and pH of this treatment being interdependent, but the concentration of leached material is of no importance. At the end of this acid treatment which hydrolyzes protopectin to soluble pectin and demethoxylates but does not substantially depolymerize the pectin, the mixture is neutralized to pH 3.5 to 7, preferably to pH 4.5, using concentrated $NH_4OH$ while agitating. The inert fibrous material is then separated by expressing or filtering off the pectin extract which can be clarified if desired. The pectin in the extract is recovered by dehydration or precipitation. The dried pectin product when dry-mixed with edible salts such as calcium citrate, calcium tartrate, calcium phosphate, and calcium gluconate, or with salts such as those of aluminum, copper, lead, iron, tin, nickel, zinc, silver, mercury, cadmium, manganese, strontium, magnesium and barium, or certain organic compounds such as hexamethylenamine, forms compositions which will jelly upon heating and cooling. Sodium, potassium, lithium and ammonium salts cannot be used. Calcium salts are preferred. Organic acids such as citric acid are added for flavoring and pH adjustment.

Variations in the interrelations of time, temperature, and pH in the extraction of the pectin have been shown by Myers and Baker, Bull. 168 (1931) and Bull. 187 (1934) of the Delaware Agricultural Experiment Station and are so numerous that if disclosure were to cover all cases data would be endless. The necessary pH values for carrying out the demethoxylation of the pectin during extraction have been obtained with hydrochloric, nitric and phosphoric acids. The limiting range of pH for the acid extraction and depolymerization of pectin is governed by the economics of the process but, in general, extractions are below pH 2. At 60° C., with the extraction medium at pH 1.5, approximately 72 hours are required for the extraction and depolymerization reaction, while with the extraction medium at pH 0.5 only approximately 4 hours are required for the same accomplishment. The higher pH is preferred. Thus at the higher concentrations of acid, the temperature of extraction being the same, conversion of protopectin to soluble pectins and their demethoxylation is most rapid. At the same concentration of acid, the rate of extraction and demethoxylation increases with temperature increases. Conditions where depolymerization of the pectin is more rapid than demethoxylation are to be avoided. If pectin has been extracted without demethoxylation, or, if source of material is a pectin preparation, other known methods of demethoxylation, such as the use of low concentrations of alkali, which creates pH values of 5 to 6 can be employed.

The pectin present in the composition is not pectic acid which is demethoxylated and depolymerized polygalacturonic acid. The percentage of methoxyl in the pectin ranges from the approximate limits of 3 and 6.5 as determined by saponification in accordance with directions in Bulletin 187 of the Delaware Agricultural Experiment Station. The optimum methoxyl content is 4.5%. The galacturonic acid content approximates 60 to 70% for apple pectins and 70 to 80% for citrus pectins. These pectins are not depolymerized polygalacturonic acid because they are characterized by the development of high viscosities in dilute water solution at certain pH values. The pH-viscosity curve is characterized by definite peaks at pH 3 or 2.9 and again at pH 2 or 1.9. The viscosities at the latter pH appear to be indicative of jellying values in non-sugar products.

A specific experimental example of this invention when applied to dried apple pomace was essentially as follows:

Seventy-five grams of pomace, 1 mm. particle size, was heated with 100 gm. N/1 HCl and 1325 gm. water at 56° C. for 72 hours. The pH at the end of the extraction period equalled 1.45 as measured with the glass electrode at 25° C. The batch was neutralized to pH 4.5 with concentrated $NH_4OH$ while stirring and then clarified using a filter-aid and suction. The extract was precipitated in twice its volume of 90% ethyl alcohol. The precipitate was dried at 60° C. A 0.5% solution of this pectin had a pH of 5.13 and a relative viscosity of 4.16 at 26° C., at pH 2.9 the viscosity was 6.01, and at pH 1.9 the viscosity was 3.62. A sample composition, made by dry-mixing 5 parts of this pectin, 1 part of calcium monophosphate, 0.5 part of tartaric acid and 20 parts of sugar to aid dispersion, when heated to boiling with 500 parts water, with stirring, and then cooled in the refrigerator, formed tender jellies with a jelly strength of 26 to 28 cm. water pressure at pH 3.45. Greater strengths were obtained by increasing the concentration of the composition.

Tomato juice, strawberry juice, grapefruit juice, lemon juice, orange juice and canned cherry juice are among the juices which have been added to a sample composition and jellied upon heating the mixture to boiling while stirring and then cooling in the refrigerator.

Specific and valuable properties imparted to jellies by the composition are low melting points, even as low as room temperature or below, and the ability to rejelly upon chilling. Temperature at which the jellies will melt is varied by varying the components,—the salt, the acid and the pectin. The proportionate parts of pectin, salt and acid which make up the composition can be varied, but, in general, especially with the pectin of higher methoxyl content, as the proportion of acid is raised that of the salt must also be raised in order to form satisfactory jellies. The components of the composition have been varied so that jellies have formed throughout the pH range 4.16 to 2.58, the clearest, most sparkling jellies forming between pH 3.5 and 3, the preferred range.

Sugar and other agents have been added to aid dispersion of the composition but are not necessary. Protective coatings can be applied to the pectin particles to aid dispersion or preservation. Sugar, flavoring materials, coloring materials, and dried fruit products have been added to the composition and satisfactorily jellied. Higher concentrations of sugar and even the high concentration of soluble solids as sugar in ordinary fruit jellies have been used satisfactorily in producing jellies, but only after the composition has been dispersed.

The procedure of adding water or fruit juice, heating to boiling, and then cooling can be varied. The dispersing liquid need only be held above the melting point of the composition in order that the solution will jelly upon chilling.

A modification of this invention is found when the pectin, ammonium pectinate, used in this composition is applied to soft fruits, e. g., strawberries, cherries, etc., before freezing. The pectin is suitably standardized with sugars and coloring materials, if necessary. It has been found to retard the loss of juice from the fruit upon thawing for use. As the juice is released from the cells of the fruit and contacts the added pectin a jelly-like coating is formed by the action of the fruit salt upon the pectin which prevents further loss of juice. This action is similar to the addition of salts favorable to jellying to the dispersing liquid instead of to the composition, the salts being obtained from the fruits which were frozen.

Other modifications and variations in the components making up the composition will readily occur to those skilled in the art. These methods and modifications of the invention are limited only by the scope of the appended claims.

We claim:

1. The process of producing powdered jellying pectin compositions, comprising, incorporation, in the dry state, of soluble pectins with a methoxyl content of between 3 and 6.5 per cent and a solution pH of 3.5 to 7.0 with a salt of at least one of the metals from the group consisting of aluminum, calcium, iron, manganese, and nickel, which will form jelly solely upon adding many times their weight of water followed by heating to boiling and cooling.

2. The process of producing powdered jellying pectin compositions, comprising, incorporation, in the dry state, of soluble pectins with a methoxyl content of between 3 and 6.5 per cent and a solution pH of 3.5 to 7.0, with an edible calcium salt, with organic acids, with flavoring materials, and with coloring materials, which will form jelly solely upon adding water followed by heating to boiling and cooling.

3. The process of producing powdered jellying pectin compositions, comprising, incorporation, in the dry state, of soluble pectins with a methoxyl content of between 3 and 6.5 per cent and a solution pH of 3.5 to 7.0, with an edible calcium salt, and with an organic acid, which will form jellies solely upon adding water at a temperature above the melting point of the composition and chilling the dispersed phase, the resulting jellies being characterized by low melting points and the ability to reset upon cooling.

GEORGE L. BAKER.
MARVIN W. GOODWIN.